United States Patent [19]

Cocke et al.

[11] Patent Number: 4,587,579

[45] Date of Patent: May 6, 1986

[54] SYSTEM FOR POSITION DETECTION ON A ROTATING DISK

[75] Inventors: John Cocke, Bedford; Thomas H. DiStefano, Bronxville, both of N.Y.

[73] Assignee: International Business Machines Corporation, Armonk, N.Y.

[21] Appl. No.: 454,745

[22] Filed: Dec. 30, 1982

[51] Int. Cl.$^4$ .............................................. G11B 5/55
[52] U.S. Cl. ...................................... 360/75; 360/77; 360/78; 369/14
[58] Field of Search ...................... 360/75, 77, 78, 135; 369/43, 44, 13, 14

[56] References Cited

U.S. PATENT DOCUMENTS

| | | | |
|---|---|---|---|
| 3,212,074 | 10/1965 | Daniels et al. | 360/78 |
| 3,426,337 | 2/1969 | Black et al. | 360/77 |
| 3,879,753 | 4/1975 | Dunn | 360/51 |
| 3,898,690 | 8/1975 | Desai | 360/51 |
| 4,157,577 | 6/1979 | Porter, Jr. et al. | 360/77 |

FOREIGN PATENT DOCUMENTS 45-27662  9/1970  Japan ..................................... 360/78

OTHER PUBLICATIONS

IBM Technical Disclosure Bulletin, vol. 23, No. 2, Jul. 1980, pp. 787–789, Servo System for Magnetic Recording Based on Time Comparison, E. Gruss et al.

*Primary Examiner*—George G. Stellar
*Attorney, Agent, or Firm*—Graham S. Jones, II

[57] ABSTRACT

An information reading/writing head is positioned to follow data tracks that are formed concentrically on a magnetic recording disk. A set of spiral radial position-indicating markings if formed which can be detected on the disk optically, or capacitively. The position of the head is determined by sensing the spiral markings. The reference for the phase detection is detected by sensing radial indicia on the disk periphery or spiral markings of servo data with a different pitch and frequency from the position-indicating spiral markings. A servo control system operated by the above disk, reads the radial position-indicating spiral pattern and the reference pattern on the disk and compares the relative phases of the two to compute the track position of the head. A set of phase-locked loops with subsequent phase comparators is used to decode the servo data.

4 Claims, 9 Drawing Figures

FIG. 3.1
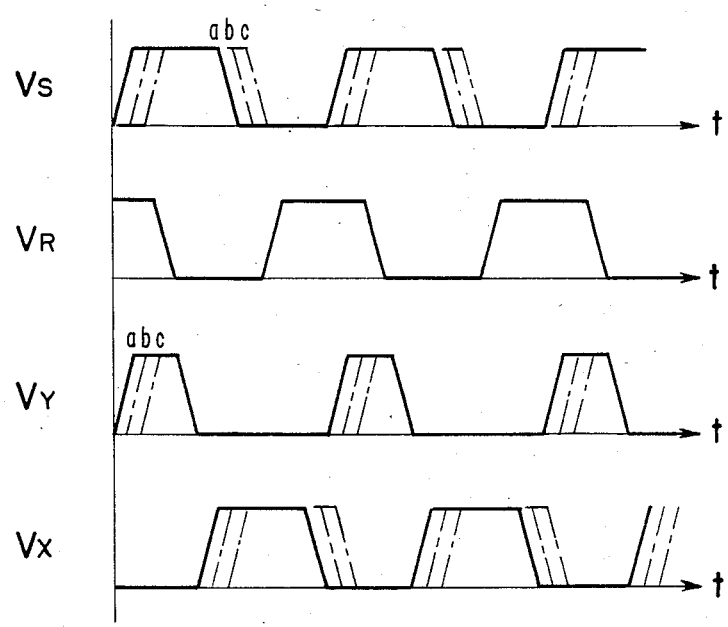
FIG. 3.2
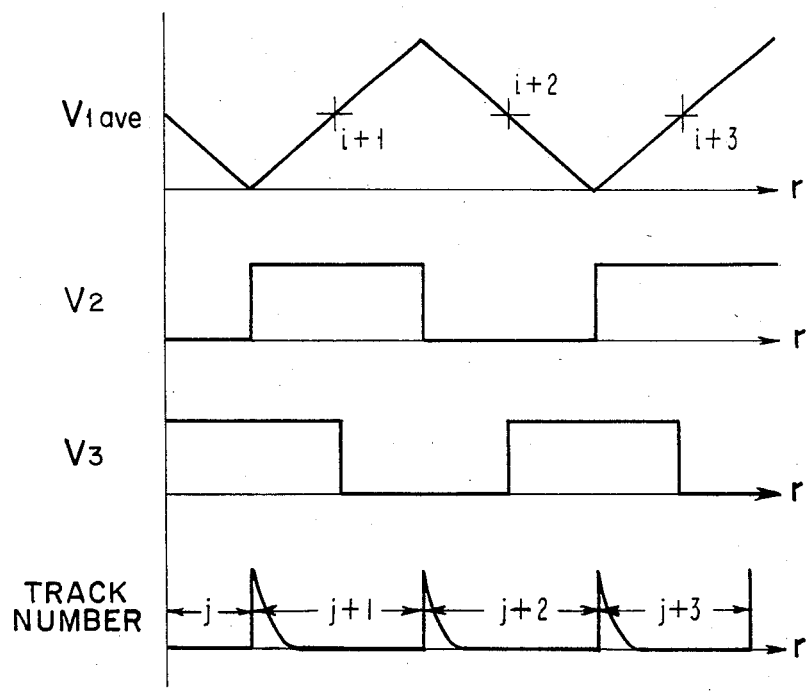

FIG. 4.1
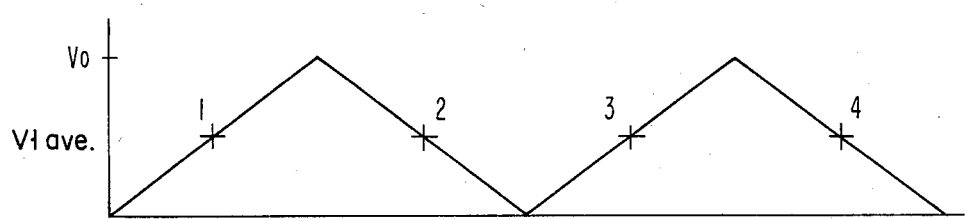
FIG. 4.2
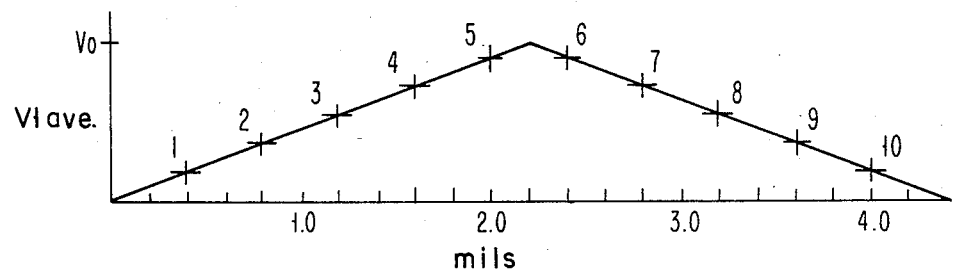

SYSTEM FOR POSITION DETECTION ON A ROTATING DISK

BACKGROUND OF THE INVENTION

1. Field of the Invention

The present invention relates to rotatable magnetic information storage disks and more particularly to position indicating markings on such disks.

2. Description of the Prior Art

U.S. Pat. No. 4,157,577 of Porter et al for a "Rotatable Storage Apparatus with Digitally Responsive Circuitry for Track Selection" describes a magnetic recording disks with a magnetic spiral servo track and annular data tracks. The position information is encoded digitally in a series of track recorded on either side of each data track. This requires extra space on the disk to store the digital position indicating tracks.

U.S. Pat. No. 3,879,753 shows a phase-locked loop for use with a magnetic recording medium which synchronizes the clock of the phase-locked loop to the data signals detected from the magnetic medium. We found no suggestion there of a spiral servo track or a separate servo truck on the medium.

U.S. Pat. No. 3,898,690 of Desai for "Phase-Locked Loop for an Electronic Sectoring Scheme foro Rotating Magnetic Memory" assigned to Pertec Corporation describes use of a phase-locked loop to coordinate the detector with the sector servo on a disk.

SUMMARY OF THE INVENTION

In accordance with this invention a magnetic disk recording system includes a magnetic recording disk with a multiple branch spiral servo pattern formed on the disk. The disk is encoded with positional data adapted to be decoded with a phase-detection system on the magnetic recording disk. The reference signals for phase detecting the positional information can be formed of indicia located on the periphery of the disk or on additional spirals, on the disk, having a different pitch and different periodicity than the radial position indicating spiral pattern.

In another aspect of this invention, a servo radial position control system includes a recording head mounted on a slider together with a servo detector head connected to a phase-decoding system including a set of phase-locked loops which cooperate to determine the radial position of the head relative to the disk by measuring the phase of a signal produced by a spiral pattern on the disk with respect to a reference phase determined by reference indicia on the disk. The reference indicia can be encoded as radial marks on the edge of the disk or as a spiral with a different pitch and frequency from the phase-encoded spiral pattern.

A magnetic disk recording system includes:

(1) a magnetic recording disk with a spiral servo pattern formed on the disk, the disk being encoded with a pattern adapted to be decoded with a phase-encoding system on the magnetic recording disk.

(2) A servo control system for the magnetic recording disk drive including a magnetic recording head, a slider, the head being mounted on the slider, a servo sensor head, the servo sensor head being mounted on the slider, a detector system, the servo sensor head being connected to the detector system, the detector system including phase-locked loops which cooperate to determine the radial position of the slider and the heads in response to spiral patterns of encoding of positioned combined with angular encoding of data on the disk.

The magnetic recording medium includes a set of circular data rings formed concentrically on the magnetic recording medium.

A set of reference markings is also encoded on the medium in the form of indicia located on the periphery of the medium or in the form of additional spirals having a different pitch from the radial-position-indicating spiral.

Preferably, measurement of the output phase of the phase-locked loops is driven by the spiral and by the reference patterns respectively to determine the radial position of the detector head on the medium, modulo a distance corresponding to two times pi radians of the relative phase shift at the detector frequency.

(3) A system for reading the medium wherein a magnetic disk recording system includes a servo radial position control for the head wherein the radial position and the servo position error signal can be obtained by measuring the phase of the signal detected from the spiral pattern with respect to that of a reference.

(4) A servo control system employing the medium which reads the radial position indicating spiral and the reference pattern on the medium to compute the track position of the head, and uses the computed head position to move the head to the desired position.

Circular data rings are formed concentrically on a magnetic recording disk. A set of spiral radial position indicating marks is formed on the disk and read optically, or capacitively with appropriate sensors. Radial position indicating servo patterns overlie the magnetic recording medium and take up no space which can be used for recording data. Reference information is encoded on the disk by indicia on the disk periphery or spirals with a different pitch and periodicity. A servo control system operated by the above disk, reads the radial position indicating spiral and the angle-encoding data on the disk to compute the track position of the head. A set of phase-locked loops is used to decode the servo data.

The foregoing and other objects, features and advantages of the invention will be apparent from the more particular description of the preferred embodiments of the invention, as illustrated in the accompanying drawings.

BRIEF DESCRIPTION OF THE DRAWINGS

FIGS. 3.1 and 3.2 show a set of waveforms of electrical signals produced by various portions of the circuit of FIG. 2 which illustrate the operation thereof. The signal Vs is derived from the spiral pattern in FIG. 1, for three radial positions of the head. The reference Vr is derived from the radial markings as read by a stationary detector. The pulse width of V1 depends upon the head position. The filtered and averaged signal V1ave. is an analog voltage corresponding to radial position within a band or track on the disk. Vx is the waveform V1 retarded in phase by 90 degrees. The digital levels V2 and V3 are used to count bands or tracks as they are crossed, as indicated by the track numbers j, j+1, j+2, j+3 . . . , etc. The level Vx is used to determine the counting direction.

FIGS. 4.1 and 4.2 the output V1ave. corresponding to radial position from one of the circuits of FIG. 2 on which for example, in FIG. 4.1 one or in FIG. 4.2 five data tracks are positioned in the radial band corresponding to a phase shift of pi radians between the signal and the reference.

In the drawings, like elements are designated with similar reference numbers, and identical elements in different specific embodiments are designated by identical reference numbers.

DESCRIPTION OF THE PREFERRED EMBODIMENT

Figure 1:
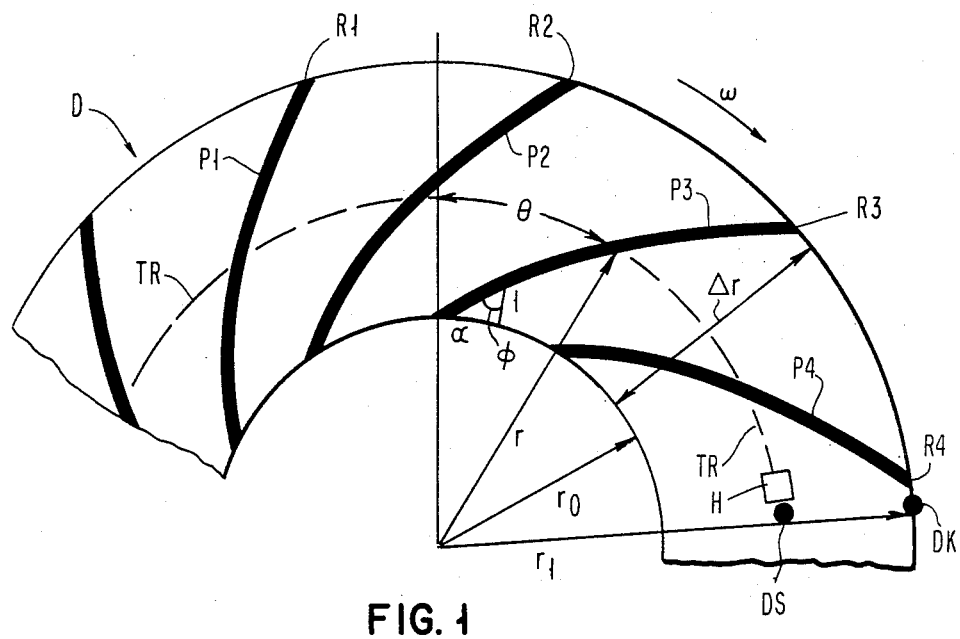
FIG. 1 shows a spiral marking pattern providing radial position-indicating information (servo tracks) and angle-encoding markings on a portion of a disk in accordance with this invention.

The evolution of disk storage memory devices is progressing towards higher track densities. That is, the tracks are being moved closer and closer together in order to maximize the quantity of data stored on a given area of a disk. Such high density requirements place demands upon the accuracy and the signal-to-noise ratio of the position error signal used to servo position the read/write head to follow the data track.

Several non-magnetic transducers have been considered for obtaining accurate position indicating signals (referred to hereinafter as "error signals"). Examples of such possible transducers are optical and capacitive transducers. However, with a single optical or capacitive transducer it is difficult to obtain data indicating the directional sense of the position error signal with respect to the nominal track center. In accordance with this invention, a pattern is provided which allows accurate positioning of a head, with position-error-signal sign information derived from a phase-encoded signal.

Alternatively, magnetic servo tracks could be used with optical or capacitive data storage. Any form of indicia readable by remote detection means, i.e. magnetic, capacitive, optical or other radiation sources, can be employed with spiral or pseudo-spiral tracks for detecting position on an axially rotatable member.

The use of a spiral pattern allows one to make a determination of the head position in the radial direction with respect to the center of the pattern. Since the radial position of a head can be determined absolutely by phase-encoded data from the spiral, rather than by deviation from an annular track as in most track following schemes, the recorded data need not follow any particular track around the disk. This means that the recording head does not need to follow the imperfections of the disk and the radial run-out of a particular pre-recorded track. Instead the data track can be recorded on the disk in such a way as to reduce or minimize the acceleration of the read/write head required to follow the data track. "Run out" is defined as the linear deviation along a radius of the disk of a data track relative to a stationary detector. The track trajectory read from the phase-encoded spiral during the writing of data is used to locate and follow the track during subsequent read-out cycles.

Instead of requiring the head to follow a previously recorded servo track, such as the conventional annular rings of tracks known and commercially available heretofore, the head can be positioned and repositioned to any given trajectory on the disk by using the absolute radial position provided by the servo scheme of this invention.

Another advantage of the instant invention is that the positional information is available continuously. It is available both during read/write operations and during seek operations without interfering in or interference from the magnetic read/write cycles.

Seek operations involve, first, a determination of the number or address of the track under the position detector on the read/write head. This can be accomplished by reading the sector header recorded on the disk or by reading the phase of a single marked branch of the spiral pattern on the disk with respect to a fiducial mark. Then the radial distance from the initial track to the desired track is calculated and used to set a trajectory for the head position. .

The head-positioning actuator is driven to follow the desired trajectory to the selected track. During this motion, the actual track position of the head relative to the disk is determined from the spiral pattern by algorithms described infra. The actual track position of the head is compared to the desired value at several points along the trajectory and the error is used to correct the drive to the actuator in order to perform better in following the desired head trajectory.

As the selected track number is approached, the positioning actuator decelerates the head so that the track is approached with the proper radial head velocity. When the head is over the selected track, as determined by track counting, the servo loop is closed and the actuator is driven to maintain the head on the center of the track as determined by the phase-encoded position detector. In one instance the track center may be located at the mid-point of the linear response of the phase-detector to radial head position. The sign of the servo signal driving the actuator is reversed for odd numbered tracks because they are located on the negative slope branch of the detector output vs position, as seen in FIG. 4.1.

A set of header data is recorded at the beginning of each conventional data record on a disk file of the type which are commercially available in the contemporary market.

With this scheme, at least in the case of some embodiments, it is unnecessary to to read a sector header to gain track number information. As described infra in certain cases the header must be consulted to complete the search for the data in order to read or to verify the track and the sector numbers. Without a doubt it will remain helpful to include such labels with the data, in order to be able to verify its identification. Positional information obtained from headers on the data track can be used as an independent check of the servo.

A third advantage of the present invention is that it is unnecessary for the spiral pattern to be centered accurately on the disk. That is possible since the same relative position is used for both the steps of reading and writing. The position relative to the center of the spiral pattern can be determined accurately by decoding the information in the pattern. The position of the head during the writing process is repeated in order to read the recorded data; this data need not lie along any particular predetermined track.

Thus the spiral disk can be printed onto the surface of the disk by a relatively imprecise method such as stamping, ink jet printing, offset printing, embossing, or laser ablation in the extreme.

A fourth advantage of this invention results from the ability to position multiple data tracks in the radial distance corresponding to a phase shift of pi radians in the signal spiral relative to the reference. For example FIG. 4.2 shows five tracks located in the annular band corresponding to a signal phase shift of pi radians. As a result, the track spacing can be significantly closer than the spacing in the features of the spiral pattern.

The operation of this position detection scheme depends upon a set of spiral marks (of either single or multiple pitch) which are read by optical, acoustic, capacitive, or other sensors. Ideally the spiral marking pattern would not interfere with the reading or writing of data stored at the same location on the disk.

A detector mounted on a read/write head is maintained at a position over the disk. The detector senses the branches of the spiral as it cuts across them during rotation of the disk. In the simple case of a set of n equally spaced spirals of the same pitch, a signal is produced about a base frequency of $$f_o = n \times \text{omega}/2 \text{ pi}$$

where "omega" is the rotational speed in radians per second and n is the number of branches of the spiral around the disk. At a center frequency $f_o$, the phase of the signal is compared to that of a reference.

The signal is obtained by reading branches of the spiral of pitch alpha, the jth branch of which is defined by $$(\text{Theta}_j) = 2(\text{pi})j/n + \text{alpha} \times (r - r_o)/r_o$$

The reference is obtained from an angle encoder on the disk or from a second set of spirals of a different pitch from the pitch of the first set of spirals. The phase comparison is made in order to obtain data which will permit calculation of the radial position of the data to a relatively high degree of accuracy.

This position is indeterminate by the number of reversals in the signal V2, across the recording band of the disk. The number of reversals across a band delta-r where the reference is determined by an angular encoder or by radial lines on the disk is $$n \text{ (alpha) (delta r)}/(\text{pi } r_0)$$

where $r_0$ is the inner diameter of the data band, delta r is the width of that band, and alpha is the pitch of the spiral as measured at the inner diameter.

AMBIGUITY IN RADIAL POSITION RESOLVED

The ambiguity in radial position can be resolved by any one of several methods.

A first method is to mark every jth branch of the signal spiral with a heavy line or a multiple branch (i.e. fill in the space between two branches of the set of spirals.)

For the case of a simple set of n spirals of pitch alpha and with n radial reference marks, the number i of specially marked spirals must be less than $$\text{alpha } (r_1 - r_0)/(2 \text{ pi } r_0)$$

The radial reference marks are also especially widened at i locations. For this simple configuration, the phase shift measured at frequency $i \times (\text{omega})/2$ pi between the wider spiral branches and the wider reference marks uniquely determines the track number under the detector head.

A second method is to count phase reversals in the phase response of the servo signal as explained infra in connection with FIGS. 4.1 and 4.2. After an initial determination of the track number, all changes in position would be measured by counting tracks crossed with the direction up/down determined uniquely by the circuitry. The radial position would be calibrated and confirmed with respect to the track number ambiguity by reading the magnetic track header.

FIG. 1 shows an example of the spiral of n branches B formed on the disk D with reference timing marks R located around the periphery of the disk D. The head H is shown on track line TR with the head H having a servo sensor Ds for sensing the spiral patterns shown. The inner radius of the data band width DBW is $r_0$ and the outer radius of the DBW is $r_1$.

The disk is rotating in the clockwise direction as shown. The DBW is the physical width of the band on the disk where the data is to be stored.

In this case, the branches follow the equation:

$$\text{Theta}_j = 2 \text{ pi } j/n + (\text{alpha}) \times (r - r_0)/r_0$$

where $\text{theta}_j$ is the angular position of the jth branch of the spiral pattern and alpha is the pitch of the spiral at the inner diameter of the pattern as illustrated by the triangle of proportion alpha: 1 shown in FIG. 1.

Then the servo detecto head reads a signal with a first harmonic component S(t), where $$S(t) = A \cos (n(\text{omega})t + n(r - r_0)(\text{alpha}/r_0))$$

in which the amplitude A and the relative phase are presumed to be nominal. The phase phi of the signal S(t) is measured relative to the first harmonic of the reference, which, in this case is obtained by reading the timing marks about the periphery of the O.D. of the disk D. The reference R(t) is, R(t) = B cos (n(omega)t)

Figure 2:
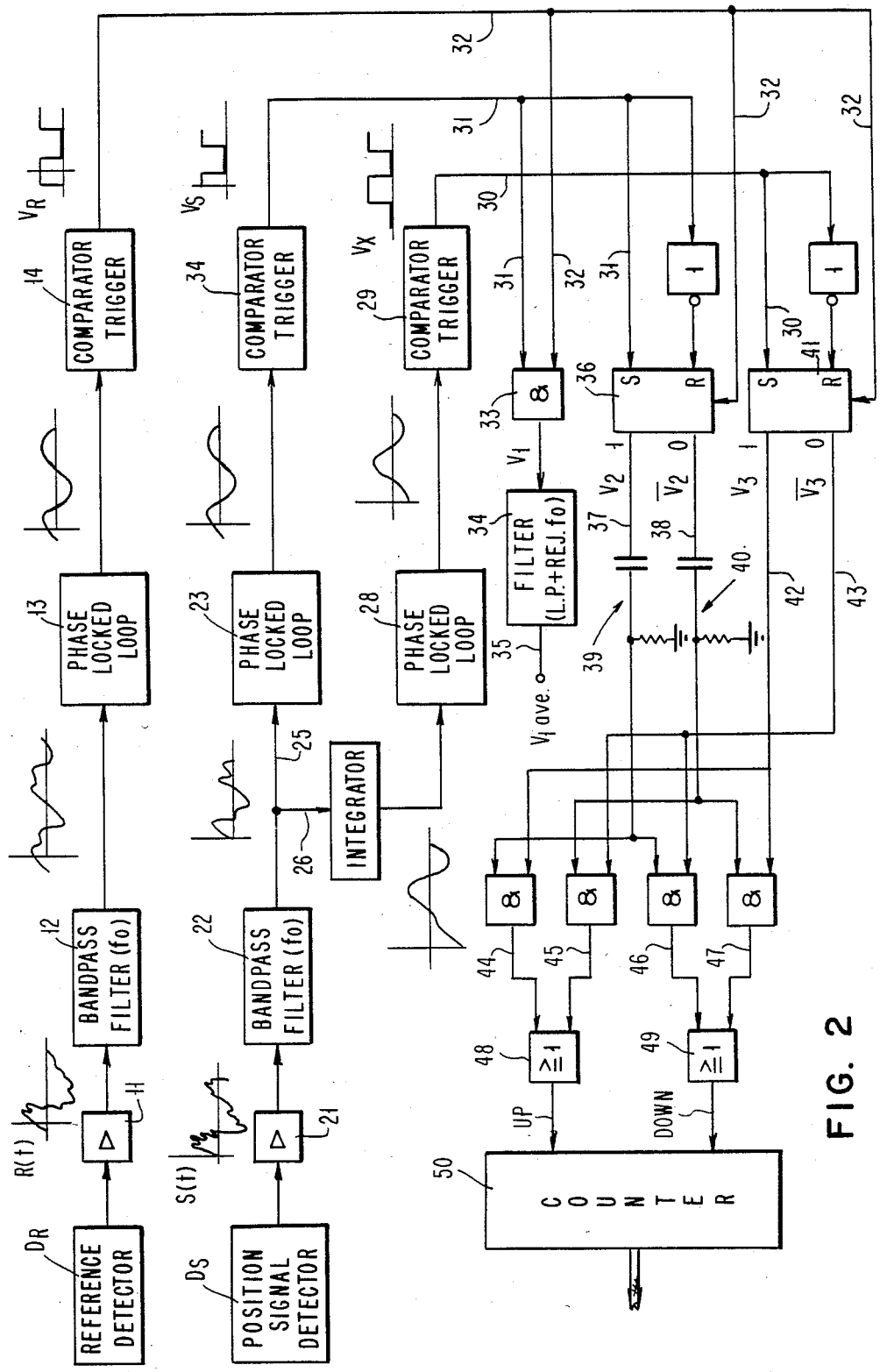
FIG. 2 shows a block diagram of a circuit for producing position indicating signals from the disk marking pattern of FIG. 1.

By comparing the phase of the signal S(t) with that of R(t), the radial position r can be determined. A circuit for making a comparison to determine the phase of S(t) with respect to R(t) is shown in FIG. 2, although there are many other possible circuits that will perform the same phase detection and counting functions. Both the signal S(t) and the reference R(t) are detected, and filtered by a bandpass filter having a pass band centered on $f_o$.

These signals are used to drive two phase-locked loops to obtain an output that is symmetrical, relatively noise free, and insensitive to variations in the envelope amplitude of S(t) and R(t). The two waveforms are shaped by two identical comparators into symmetrical square waves. These square waves are binary multiplied to produce a pulse train V1 that is filtered to obtain a voltage V1ave. that depends upon the relative phase of S(t) and R(t). The output voltage from the circuit rises linearly with phase difference or with radial position of the sense head, up to pi radians and then falls linearly from pi radians to minus two pi radians.

Several examples illustrate the principles involved as follows:

(I) a single track per phase reversal, (II) multiple track per phase reversal where the tracks are written in a way to minimize head motion or acceleration rather than to remain centered on the phase curve, (III) a spiral pattern and a counter-rotating reference spiral, both of which are detected by the same sensor.

EXAMPLE I

In this case there are 955 phase reversal transitions or tracks per cm. of the disk pattern as determined by the phase-encoded scheme.

The disk O.D. is of the order of 35.56 cm and the I.D. is 20.32 cm.

The spiral branches and intervening spaces are 10 micrometers wide at $r_0$, with a pitch of 10 to yield a center frequency $f_o$ of 190.6 khz at 3600 rpm.

There are 3176 branches of the spiral pattern, yielding 7,582 tracks across the disk if one track is placed at the mid point of each phase reversal of V2 as illustrated in FIG. 3B for the tracks j+1. j+2, j+3.

EXAMPLE II

It is possible to achieve a high track density with a relatively coarse pattern by placing several tracks per phase reversal as is illustrated in Example II.

In this case, the O.D. is 35.56 cm. and the I.D. is 20.32 cm. The spiral is 50.8 micrometer lines and spaces at the disk ID. The pitch is a single spiral pitch of 2.

The center frequency $f_o$ of 168.6 kHz is obtained by reading the 2809 branches at a rotational speed of 3600 rpm. From the inner radius to the outer radius of the disk there are 1341 reversals of the output V2 of the phase detector. Five tracks are spaced equally between these reversals by locking onto five equally spaced voltage levels in the position output V1ave. as in FIG. 4.2. With this system ten tracks are placed within every pi of signal phase shift, to yield a total of 6706 tracks or 880 tracks/cm. This track density is achieved with a maximum line spacing in the pattern of 98.4 lines/cm. The tracks can be made to follow any arbitrary pattern on the disk by setting the servo positioner to follow a predetermined voltage with the position derived voltage V1ave.

EXAMPLE III

In this example, the same sensor element is used to detect both the signal and the reference. The sensor is mounted on the head H. In order that the signal and the reference waves can be detected and compared separately, they should occur at different frequencies that are related by a ratio of relatively prime numbers. One possible pattern with suitable properties is the double Archimedes spiral pattern in FIG. 6 with a 3:2 ratio between the signal and the reference frequencies. Other suitable ratios are 4:3, 5:4, 7:5, etc. In order to increase the sensitivity of the relative phase to radial position, the pitch of the reference spirals is of sign opposite to that of the signal spirals, although the reference spirals could be chosen to be the degenerate case of radial lines.

As outlined in the Table below, the minimum line width and line spacing on the signal spirals are chosen to be 0.0254 cm at the disk ID. The spacing on the reference spiral is 0.0508 cm, with the line width of 0.0254 cm to yield a frequency ratio q/p between signal and reference of 3:2. The pitches +2 and −2 of the signal and reference spirals respectively are equal and opposite. With the minimum line spacings specified at the disk ID, the numbers of branches on the signal and the reference patterns are 1257 and 833 respectively, to yield input frequencies of 75,420 Hz and 50,280 Hz respectively at the sensor. The two waves are separated by band-pass filters 52 and 53 in the circuit of FIG. 5. Each wave then drives a phase-locked loop, 13 or 23, with a frequency divider 54 or 55 in the feedback loop. The output of each phase-locked loop is a clean and stable waveform at the p or q harmonic for the signal or reference channel respectively. When so multiplied, the frequencies of the two waves are the same; in this example, this frequency fo is 150.8 khz. The phase difference between the two waves depends on the radial position of the sensor, since the signal phase advances and the reference phase retards with increasing radial distance on the disk. For Example III, the difference between the phase shifts (of the frequency multiplied waves) increases at a rate of 990 rad/cm with radial distance. One track is placed every pi of phase shift, as in FIG. 4.1 to yield 315 tracks/cm. One virtue of this scheme is that the track density (315 tracks/cm) is much greater than the highest line density (17.7 lines/cm.) This advantage can be improved by multiplying both p and q by an integral number in order to raise the detection frequency fo.

TABLE

EXAMPLE III

| | SIGNAL CHANNEL | REFERENCE CHANNEL |
|---|---|---|
| DISK ID | 20.32 cm | 20.32 cm |
| DISK OD | 35.56 cm | 35.36 cm |
| SPIRAL PITCH | +2 | −2 |
| LINE THICKNESS (AT ID) | 0.0254 cm | 0.0254 cm |
| SPACING THICKNESS (AT ID) | 0.0254 cm | 0.0508 cm |
| SPIRAL BRANCHES | 1257 | 838 |
| INPUT FREQ. (AT 60 RPM) | 75420 Hz | 50,280 Hz |
| FREQ. MULTIPLIER | p = 2 | q = 3 |
| OPER. FREQ. fo | 150.8 kHz | 150.8 kHz |
| PHASE SENSITIVITY dθ/dr | 495 rad./cm | −495 rad./cm |
| TOTAL SENSITIVITY dθ/dr | | 990 rad./cm. |
| TRACKS/CM. | | 315 tracks/cm |
| TOTAL TRACKS | | 2401 tracks |

OPERATION OF THE POSITION DETECTION SYSTEM

FIG. 1 shows a portion of a magnetic recording disk D rotating with angular velocity, omega. On the surface of the disk are a number of spiral patterns P1, P2, P3, P4, . . . . The spiral patterns include reference position indicating markings R1, R2, R3, R4 . . . respectively at the outside of the disk which indicate the angular position about the periphery of the disk D. A magnetic track TR to be located by a magnetic recording head H is shown in dotted line form. Using the markings shown and the circuits of FIG. 2, an automatic servo system, not shown can drive the head to the desired radial position relative to the center of the disk D in order to read the data recorded on track TR on the disk D. Considering the spiral branch P3, a unit right triangle has been drawn with a vertex on line P3 and the hypotenuse extending generally tangent to line P3 having an angle of phi relative to the radial line of unit length "l". The line tangent to the annular line is of length alpha with alpha designating the tangent of the angle phi. Alpha also indicates the pitch of the spiral P3 at radius $r_0$ which is the inner radius of the magnetic recording surface on the disk. The outer radius of the disk is $r_1$ and the difference between $r_0$ and $r_1$ is delta r.

FIG. 2 shows a block diagram of a circuit which is adapted to produce signals which will control the servo system to reach the correct recording track on the disk D. A reference detector Dr detects the markings indicating the angular velocity of the disk D which can be located on the periphery of the disk D. The detector Dr is located in a fixed position and it reads the markings R, R2, R3, R4, ..., Rn about the periphery of the disk to produce signal R(t) which indicates the relative angular position of the disk with respect to any given spiral path Pn. At the same time the detector Ds which is affixed to the magnetic recording head reads the markings P1, P2, P3, P4, ..., Pn about the disk. The timing of the output waves produced involves a phase shift which is dependent upon the radial position of the head H from radius $r_0$ to $r_1$. It will be obvious that the angular position will be zero when the head H extends radially to length $r_1$ to the outermost reaches of the disk D since the reference marking and the phase-encoded spiral marking are at the same angular or azimuthal position on the disk. Detector Dr which can sense an optical or capacitive marking on the disk D provides an output signal. The detector Ds is connected to provide a similar output serving as the position signal detector which generates the signal S(t). Referring more particularly to FIG. 2, the output of detector Dr is connected to amplifier 11 which produces a sine wave containing noise etc., as indicated by the sketch of R(t) which is the function produced at the output of amplifier 11 as amplified. A similar output S(t) is shown as the output of amplifier 21 which receives the output of the detector Ds. The amplifier 11 supplies an input to a band-pass filter 12 centered at frequency fo which passes the fundamental frequency which is to be detected by the system with the high frequency components of the signal filtered out. Filter 22 is similar to filter 12 and it receives the signal from amplifier 21 to produce a similar signal which will lag by the phase shift mentioned above as shown in FIG. 2. The output of filters 12 and 22 are connected to phase-locked loops 13 and 23 respectively which serve to generate relatively pure sine waves with the same phases as the outputs of the respective band-pass filters 12 and 22. The output could also be a square wave instead of the smoothed sine wave shown. In addition, the output of the band-pass filter 22 is connected to an integrator circuit which integrates the output of filter 22 producing a wave which has a lag of 90 degrees in phase shift. The output of the integrator 27 is also connected to a phase-locked loop 28 which passes its sine (or square) wave output to a comparator trigger 29 that has an output line 30, which carries output signal Vx shown in FIG. 3.1 with its phase shift value varying with the signal Vs. The outputs of phase-locked loops 13 and 23 are each connected to the input of comparator triggers 14 and 24 respectively which provide their own square wave output versions VR and VS, of the sine-wave inputs they receive or the square waves they receive in the alternative. As can be seen the waveforms of signals VS and VR are shown in FIG. 3.1 also. The advantage of a square wave, is that the next portion of the system is digital rather than analog in function and square waves give the accurate timing required for digital circuits. The signals VR and VS are combined in an AND circuit 33 which produces signal V1 shown in FIG. 3.1. That is accomplished because AND circuit 33 is connected by lines 31 and 32 from the circuits 14 and 24 to produce a combined output V1 also shown in FIG. 3.1 which is passed to a filter circuit 34 with a low pass and rejection frequency fo, which provides at its output line 35 a signal V1ave. which is an average of the V1 signal. This is an error signal of the kind which has been used traditionally in magnetic disk recording signals to designate the degree of error of the head position with a curve as shown in FIG. 3.2. The centers of tracks j, j+1, and j+3 are indicated by the cross marks on the curve V1 ave. Next, the outputs Vs, Vx and Vr on lines 30, 31 and 32 are passed to the flip flops 36 and 41 which are set by lines 31 and 30 respectively and reset by positive values on line 32 in both cases. The truth table in the track counting table below shows the sign of the increments applied to the track counting circuits.

| TRACK COUNTING TABLE | | |
|---|---|---|
| | V3 + | − |
| dV2 + | Up | Down |
| dt − | Down | Up |

More specifically, the outputs on lines V2 and $\overline{V2}$ the curve of V2 being shown in FIG. 3.2, from the respective flip flops 36 are passed through RC filters to the inputs to a set of AND gates 44–47 with the negative outputs alternately connected to provide up and down counting inputs to the OR gates as shown in accordance with the above truth table. The outputs of the OR circuits 48 and 49 pass to the increment and decrement input to count up or to count down the counter 50.

FIG. 4.1 shows a servo track signal of the kind shown in FIG. 3B for signal V1ave. with the various tracks lying at the mid-points of the voltage of V1ave. FIG. 4.2 shows an alternative arrangement with the tracks lying at equal distances along the V1ave. vs r curve. In the particular arrangement shown, five tracks are squeezed into the space corresponding to a phase input of pi radians of Vs with respect to Vr. The equally spaced tracks can be made to follow an arbitrarily path around the disk by having the track-following-servo follow the appropriate voltage on V1ave., with special care given to handling the transition at the points where the slope of V1ave. changes sign.

Figure 5:
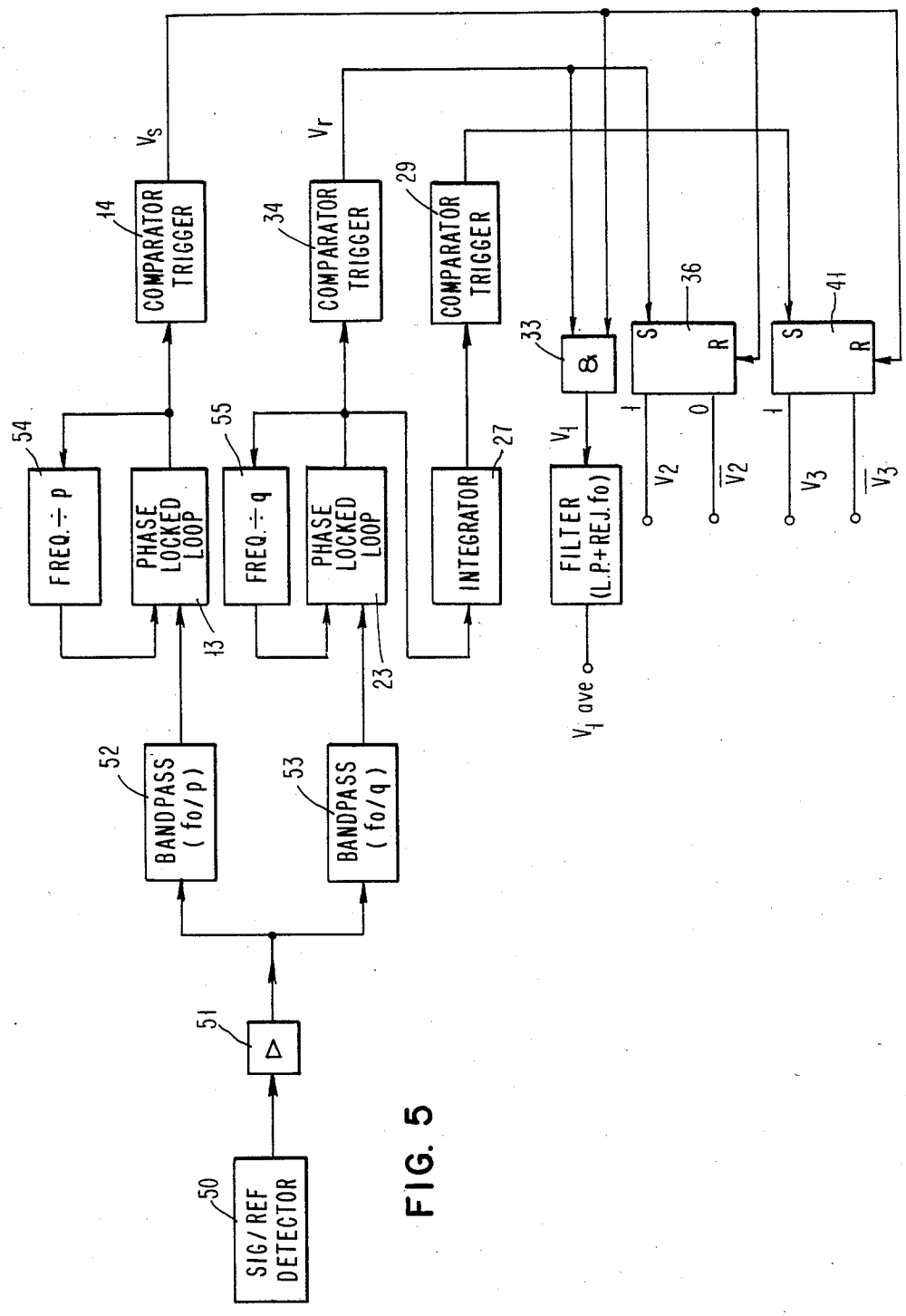
FIG. 5 shows a modification of the circuit of FIG. 2 adapted for use where the periodicity of the signal and reference markings are different. This circuit is used to generate the positional information from one detector element 50 which reads both a signal spiral pattern and a reference spiral pattern where the ratio of branches on the signal pattern to the number on the reference pattern is q/p.

FIG. 5 shows a circuit which is adapted to operate with an arrangement in which the signal and reference patterns are detected by the same sensor. The frequencies are different so that the two waves can be separated by the two bandpass filters 52 and 53 having center frequencies of fo/p and fo/q which correspond to the reference channels respectively. The ratio p:q is of the relatively prime integers relating the number of branches as the reference and signal patterns respectively.

The bandpass filters drive the phase-locked loops 13 and 23 which have a feedback in which the frequency is divided by p and q respectively by divider circuits 54 and 55 so that the frequencies of the output waves are correspondingly multiplied. The output frequencies of the phase lock loops 13 and 23 are equal, both being at fo. The output of loop 23 passes to integrator 27. The remainder of the circuit which is the same as in FIG. 2, does the phase comparison and track counting functions as supra.

Figure 6:
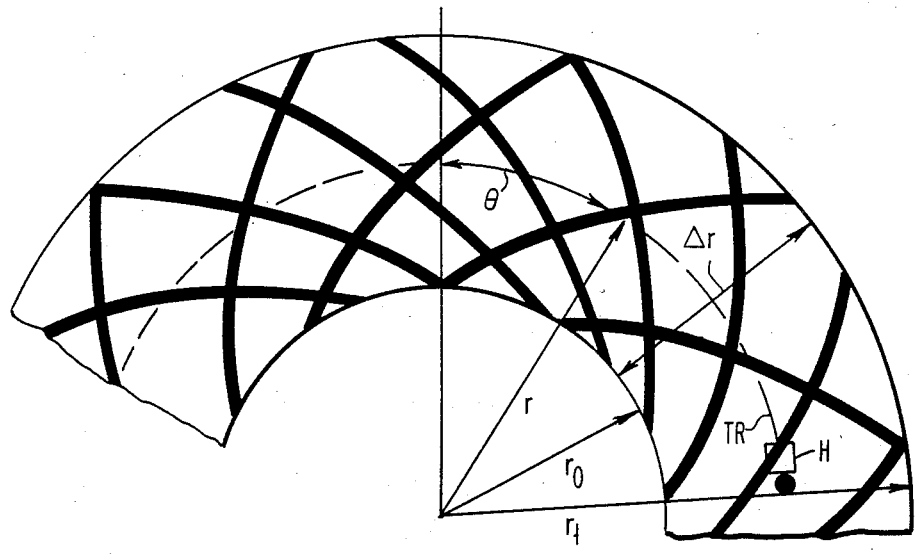
FIG. 6 shows a disk marking pattern comprising two sets of spirals, one for the signal and one for the reference. The signal pattern comprises a set of Archimedes spirals with n branches spaced equally around the disk. The reference pattern likewise comprises a set of 2n/3 branches spaced equally around the disk.

FIG. 6 shows schematically a disk pattern in which both the phase encoded spiral and the reference marks are detected by the same sensor on the head H. In this case, the phase-encoded spiral are Archimedes spirals of one pitch, and the reference marks are Archimedes spirals of the opposite pitch. The numbers of branches in the phase-encoded pattern is related to the number of branches in the reference pattern as the ratio q/p of the two relatively prime members. This ratio q/p should be the same as the ratio of frequency multiplication used in the phase-locked loops 13 and 23 of the detector, as outlined in FIG. 5.

Figure 7:
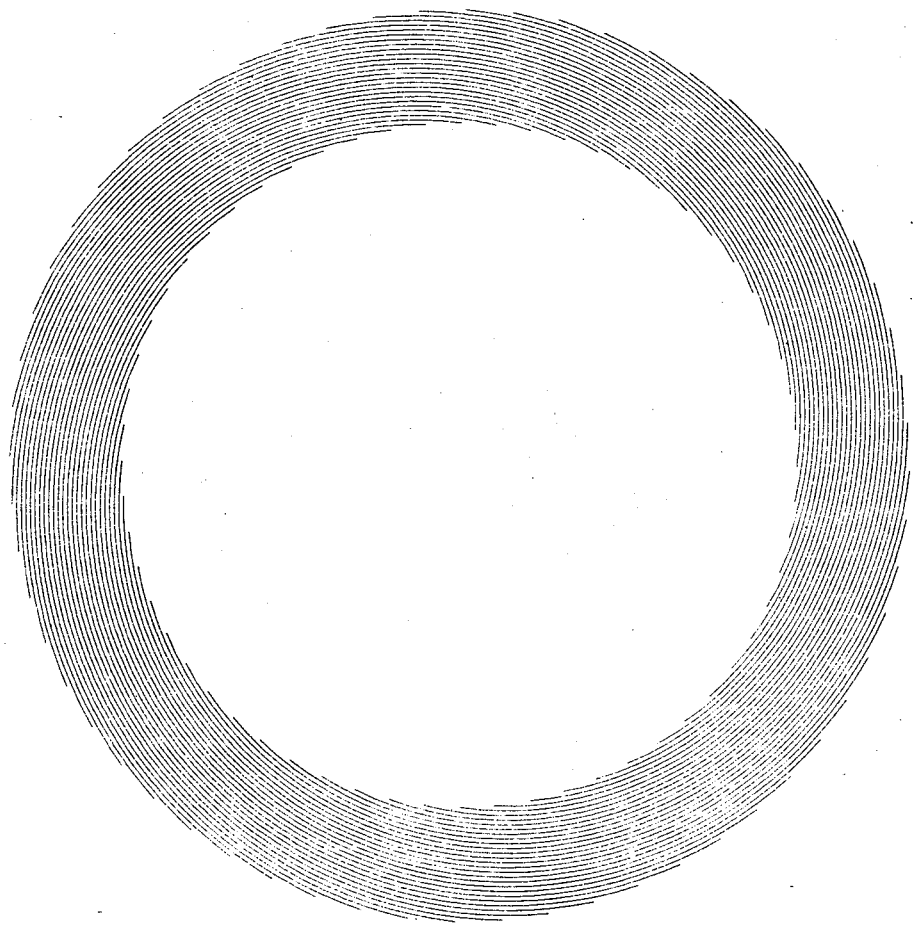
FIG. 7 shows a computer-generated spiral pattern of n branches (were n=60) in accordance with this invention.

FIG. 7 shows a computer-generated pattern comprising 60 equally-spaced Archimedes spirals.

What is claimed is:

1. A magnetic disk recording system including
   a magnetic recording head, a servo control system for said head,
   a magnetic recording medium including a set of circular data rings formed concentrically on said magnetic recording medium,
   a set of spiral radial-position-encoding patterns which are detectable on said medium including signal patterns and reference patterns for position encoding,
   detector means for detecting the signal and reference patterns on said medium,
   means comprising a reference phase locked loop and a position phase locked loop connected to receive reference signals and position signals respectively, a plurality of comparator trigger circuits including a reference comparator trigger, a position comparator trigger, and an integrated position comparator trigger, with said position signal also passing to an integrator connected to a third phase locked loop, with each of said phase locked loops having its output connected to the corresponding one of said comparator trigger circuits,
   said trigger circuits being connected to a pair of flip flop circuits, and an AND gate, said flip flop circuits being connected to a plurality and AND gates and an up down counter.

2. A system in accordance with claim 1 wherein said reference comparator trigger is connected to the reset input of both of said flip flops,
   said position comparator trigger being connected to said set input of a first one of said flip flops, and said integrated position comparator trigger being connected to the set position of the other of said flip flops, with said outputs of said flip flops being connected to said AND gates in accordance with the truth table spura,
   said AND gates driving an up down counter and an average AND gate connected to the outputs of said reference comparator trigger and said position comparator trigger providing an average error signal indicating the degree of error of head position.

3. A system in accordance with claim 1 wherein said detector means for detecting the signal and reference patterns on said medium comprises a reference detector and a position signal detector, and a pair of band pass filters at passing a given fundamental frequency fo, with one of said filters being connected to each of said detectors respectively.

4. A system in accordance with claim 1 wherein said detector means for detecting the signal and reference patterns on said medium,
   includes a signal reference detector connected to a pair of bandpass filters at frequency fo/p and fo/q respectively, with said phase locked loops being at the frequency divided by p and q respectively.

* * * * *